(12) United States Patent
Davies

(10) Patent No.: US 7,085,592 B1
(45) Date of Patent: Aug. 1, 2006

(54) WIRELESS TRANSMISSION EVALUATION SYSTEM AND METHOD

(75) Inventor: Douglas Allan Davies, Mississauga (CA)

(73) Assignee: Alcatel Canada Inc., Kanata (CA)

( * ) Notice: Subject to any disclaimer, the term of this patent is extended or adjusted under 35 U.S.C. 154(b) by 578 days.

(21) Appl. No.: 09/676,402

(22) Filed: Sep. 29, 2000

(51) Int. Cl.
*H04B 1/38* (2006.01)

(52) U.S. Cl. ............... 455/562.1; 455/12.1; 455/67.14; 455/423; 455/424; 455/561; 343/703; 343/757; 343/758; 343/761; 343/882

(58) Field of Classification Search ............... 455/12.1, 455/67.14, 423, 424, 425, 561, 562, 3.06, 455/426.2; 343/703, 757, 758, 761, 765, 343/766, 882
See application file for complete search history.

(56) References Cited

U.S. PATENT DOCUMENTS

| | | | | |
|---|---|---|---|---|
| 4,553,145 | A | * 11/1985 | Evans ......................... | 342/360 |
| 4,859,933 | A | * 8/1989 | Taylor et al. ............ | 324/76.29 |
| 5,228,053 | A | * 7/1993 | Miller et al. ................ | 370/335 |
| 5,361,402 | A | * 11/1994 | Grube et al. ............. | 455/67.11 |
| 5,419,521 | A | * 5/1995 | Matthews ................ | 248/278.1 |
| 5,442,811 | A | * 8/1995 | Kobayashi et al. ....... | 455/67.11 |
| 5,444,698 | A | * 8/1995 | Kito ........................... | 370/280 |
| 5,465,393 | A | * 11/1995 | Frostrom et al. ........... | 455/423 |
| 5,548,820 | A | * 8/1996 | Victorin .................... | 455/67.14 |
| 5,613,217 | A | * 3/1997 | Hagstrom et al. ........ | 455/67.11 |
| 5,663,968 | A | * 9/1997 | Heuer ........................ | 714/745 |
| 5,673,057 | A | * 9/1997 | Toland et al. ............... | 343/761 |
| 5,754,588 | A | * 5/1998 | Tanaka ....................... | 375/222 |
| 5,784,406 | A | * 7/1998 | DeJaco et al. .............. | 375/224 |
| 5,787,350 | A | * 7/1998 | van der Vorm et al. .... | 455/446 |
| 5,896,574 | A | * 4/1999 | Bass, Sr. .................... | 455/557 |
| 5,930,707 | A | * 7/1999 | Vambaris et al. ........... | 455/424 |
| 5,978,659 | A | * 11/1999 | Kim ......................... | 455/67.11 |
| 5,978,675 | A | * 11/1999 | Niemela ..................... | 455/423 |

(Continued)

FOREIGN PATENT DOCUMENTS

| | | |
|---|---|---|
| FR | 2 767 991 | 3/1997 |
| GB | 647064 | 12/1950 |
| GB | 2 323 931 | 10/1998 |

OTHER PUBLICATIONS

Jeang et al., WPI/Derwent Abstract for "Transmitting and receiving antenna measuring circuit for base station of mobile communication system, comprises transmitting and receiving antenna VSWR (voltage standing wave ration) measuring circuits for variable–attenuation and detection", 1996, KR 1996077618, XP–002299975.

*Primary Examiner*—William Trost
*Assistant Examiner*—James D Ewart
(74) *Attorney, Agent, or Firm*—McCarthy Tetrault LLP

(57) ABSTRACT

A signal testing system and method for evaluating wireless communication signals transmitted between a base station and a communication site is provided. The signal testing system comprises an antenna located at the communication site for communicating the wireless communication signals between the base station and the communication site, an adjustable mount associated with the antenna for orienting the antenna in a plurality of pan orientations and a plurality of tilt orientations, an adjustable boom associated with the adjustable mount for positioning the antenna at a plurality of heights and a communication unit to measure characteristics of the wireless communication signals. The adjustable mount is fixed in a set pan orientation and a set tilt orientation and the adjustable boom is fixed height when the communication unit measures the characteristics of the wireless communication signals. The method uses the system.

9 Claims, 6 Drawing Sheets

U.S. PATENT DOCUMENTS

| | | | |
|---|---|---|---|
| 6,031,498 A * | 2/2000 | Issler | 343/703 |
| 6,041,236 A * | 3/2000 | Bernardin et al. | 455/446 |
| 6,052,583 A * | 4/2000 | Bernardin | 455/423 |
| 6,085,095 A * | 7/2000 | Collmann | 455/453 |
| 6,150,987 A * | 11/2000 | Sole et al. | 343/757 |
| 6,167,272 A * | 12/2000 | Hellstern | 455/446 |
| 6,169,896 B1 * | 1/2001 | Sant et al. | 455/424 |
| 6,188,372 B1 * | 2/2001 | Jackson et al. | 343/882 |
| 6,201,802 B1 * | 3/2001 | Dean | 370/350 |
| 6,239,767 B1 * | 5/2001 | Rossi et al. | 343/882 |
| 6,253,065 B1 * | 6/2001 | Palmer | 455/67.13 |
| 6,255,996 B1 * | 7/2001 | Wallace | 343/702 |
| 6,262,687 B1 * | 7/2001 | Bai et al. | 343/757 |
| 6,282,408 B1 * | 8/2001 | Jang | 455/67.13 |
| 6,285,339 B1 * | 9/2001 | McGill | 343/882 |
| 6,405,043 B1 * | 6/2002 | Jensen et al. | 455/446 |
| 6,456,652 B1 * | 9/2002 | Kim et al. | 375/224 |
| 6,466,547 B1 * | 10/2002 | Lim et al. | 370/241 |
| 6,512,788 B1 * | 1/2003 | Kuhn et al. | 375/224 |
| 6,538,612 B1 * | 3/2003 | King | 343/757 |
| 2001/0018326 A1 * | 8/2001 | Link | 455/3.05 |
| 2001/0041539 A1 * | 11/2001 | Juntunen et al. | 455/67.7 |
| 2002/0058503 A1 * | 5/2002 | Gutowski | 455/423 |
| 2002/0071406 A1 | 6/2002 | Bursztejn et al. | |

* cited by examiner

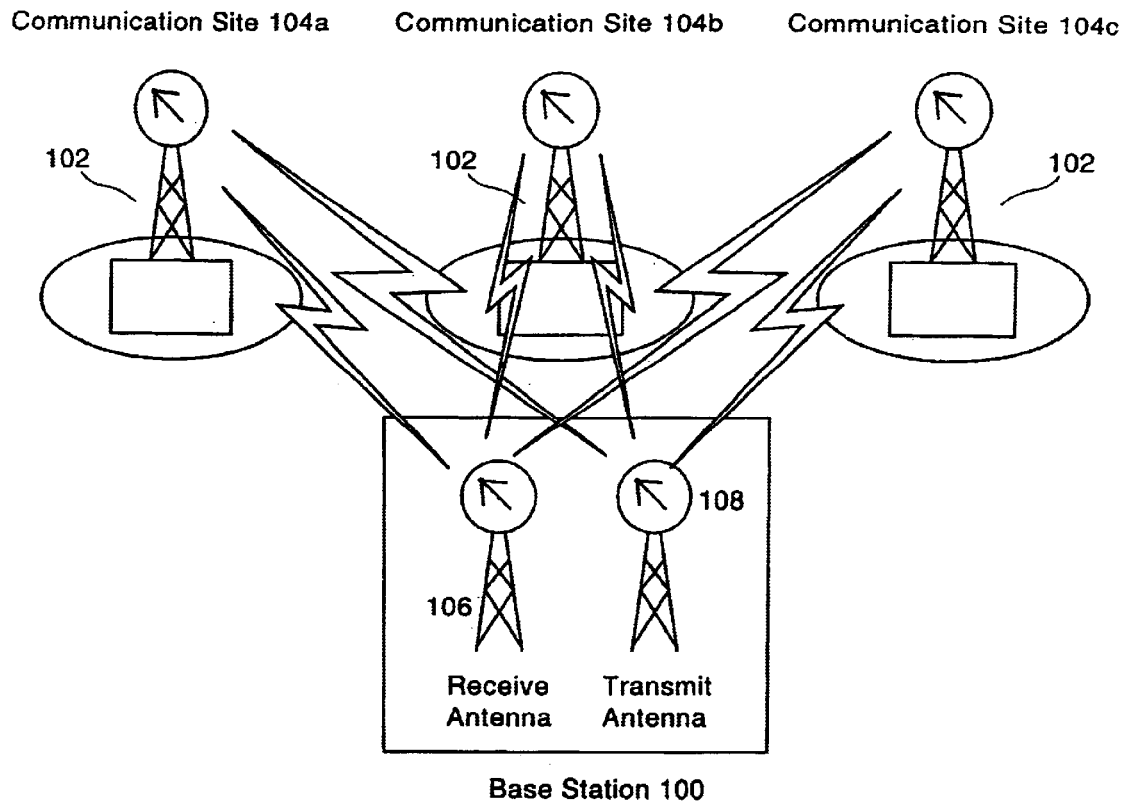
Figure 1
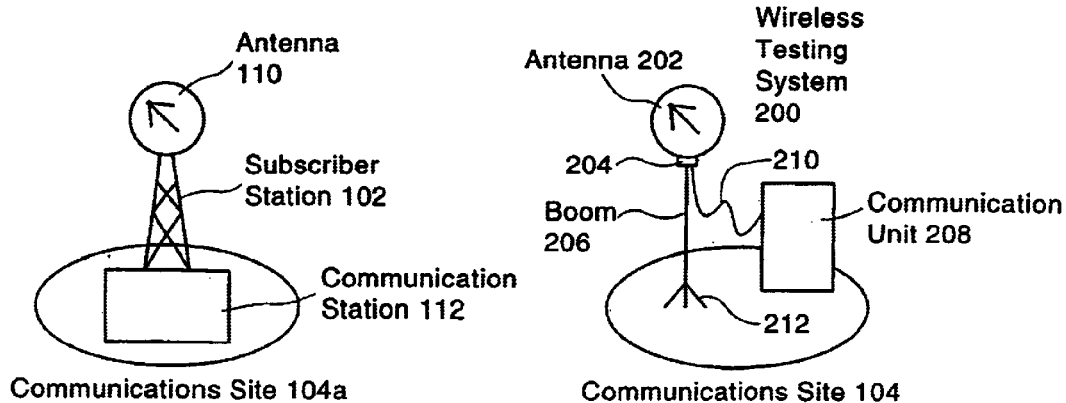
Figure 1a
Figure 2

WIRELESS TRANSMISSION EVALUATION SYSTEM AND METHOD

FIELD OF THE INVENTION

The invention relates generally to a system and method to test a wireless communication site for wireless communications with a base station and more specifically to a system and method to measure characteristics of wireless communication signals using a portable, adjustable antenna system.

BACKGROUND OF THE INVENTION

Occasionally, it is neither practical nor desirable to connect users of a communication network using physical links, such as wires, cables or fibre links. Instead, a wireless communication network may be used to connect the communication network. In a typical wireless communication network, there is a base station communicating with subscriber stations. The base station typically has separate antennae for the receive and transmit functions.

A user at a subscriber station communicates with the base station using a fixed antenna at the user's communication site. Often there are a number of potential locations for the communication site that may be used. It is desirable to be able to determine the suitability of these communication sites without installing a fixed antenna at each site then testing each site.

SUMMARY OF INVENTION

In a first aspect, the invention provides a signal testing system for evaluating wireless communication signals transmitted between a base station and a communication site. The signal testing system comprises an antenna located at the communication site for communicating the wireless communication signals between the base station and the communication site, an adjustable mount associated with the antenna for orienting the antenna in a plurality of pan orientations and a plurality of tilt orientations, an adjustable boom associated with the adjustable mount for positioning the antenna at a plurality of heights and a communication unit to measure characteristics of the wireless communication signals. The adjustable mount is fixed in a set pan orientation and a set tilt orientation and the adjustable boom is fixed at a set height when the communication unit measures the characteristics of the wireless communication signals.

The wireless testing system may receive wireless communication signals sent downstream from the base station to the testing system. The antenna may receive the wireless communication signals and the communication unit may receive the wireless communication signals from the antenna and may measure characteristics of the wireless communication signals.

The wireless testing system may transmit wireless communication signals upstream to the base station from the testing system. The communication unit may generate the wireless communication signals. The antenna may transmit the wireless communication signals to the base station. The communication unit may measure characteristics of the wireless communication signals.

The wireless testing system may have the communication unit comprising a signal measurement device to measure characteristics of the wireless communication signals communicated with the base station and a modem to process the wireless communication signals communicated with the base station. The wireless testing system may further have the signal measurement device as a signal analyzer integrating power signals around frequencies associated with the wireless communication signals. The wireless testing system may still further have modem as a network interface unit. The wireless testing system may still further have the communication unit further comprising a coupler connected to the antenna to direct the wireless communication signals and have the signal measurement device connected to the coupler and the modem connected to the coupler. The wireless testing system may still further transmit the wireless communication signals upstream to the base station with the modem generating the wireless communication signals, the wireless communication signals being provided to the antenna, the antenna transmitting the wireless communication signals and the signal analyzer measuring characteristics of the wireless communication signals. Alternatively, the wireless testing system may still further receive the wireless communication signals sent downstream from the base station to the testing system, with the antenna receiving the wireless communication signals, the wireless communication signals being provided to the modem and the signal analyzer unit measuring characteristics of the wireless communication signals.

The wireless testing system may further comprise a controller to orient the mount in one of the plurality of pan orientations and one of the plurality of tilt orientations.

The wireless testing system may further comprise a bracket attached to the antenna, the bracket allowing positioning of the antenna at a plurality of angles along a plane to change a polarity of the wireless communication signals sent between the base station and the wireless testing system.

The wireless testing system may further have an attenuator in the communication unit to selectively attenuate the wireless communication signals to produce attenuated signals simulating attenuating effects of ambient atmospheric and meteorological conditions around the communication site. The wireless testing system may still further have the attenuator providing the attenuated signal to the coupler.

In a second broad aspect, the invention provides a method of evaluating wireless communication signals communicated between a wireless testing system and a base station. The wireless testing system comprises an antenna for communicating the wireless communication signals with the base station, an adjustable mount associated with the antenna for orienting the antenna in a plurality of pan orientations and a plurality of tilt orientations, an adjustable boom attached to the adjustable mount for positioning the antenna at a plurality of heights and a communication unit associated with the antenna. The method of evaluating wireless communication signals comprises positioning the antenna at a set height, at a set pan position and a set tilt position and evaluating the characteristics of the wireless communication signals by integrating power signals of the wireless communication signals across a frequency band associated with the wireless communication signals.

The method of evaluating wireless communication signals may further comprise variably attenuating the wireless communication signals before evaluating the characteristics of the wireless communication signals to simulate ambient atmospheric and meteorological conditions around the wireless testing system. The method may still further comprise evaluating the characteristics of the wireless communication signals transmitted by the wireless testing system to the base station. Alternatively, the method may further comprise evaluating the characteristics of the wireless communication signals received by the wireless testing system from the base station.

In a third broad aspect, the invention provides a method of simulating ambient atmospheric and meteorological conditions for a wireless communication system using a wireless testing system. The wireless testing system comprises an antenna for communicating the wireless communication signals with the base station, an adjustable mount associated with the antenna for orienting the antenna in a plurality of pan orientations and a plurality of tilt orientations, an adjustable boom attached to the adjustable mount for positioning the antenna at a plurality of heights, a signal measuring device associated with the antenna and a signal attenuator associated with the antenna. The method comprises positioning the antenna at a set height of the plurality of heights, at a set pan of the plurality of pan orientations and at a set tilt of the plurality of tilt orientations, evaluating characteristics of the wireless communication signals transmitted by the base station and received by the signal measuring device, attenuating the wireless communication signals until the signal measuring device no longer receives the wireless communication signals transmitted by the base station, calculating the atmospheric and meteorological conditions corresponding to the amount of attenuation based on the distance between the antenna and the base station and comparing the calculations of the atmospheric and meteorological conditions to a predetermined threshold level required to maintain a level of service required for communications with the base station when the atmospheric and meteorological conditions exist. If the level of attenuation exceeds the threshold level, the antenna placement at the communication site is acceptable.

In another broad aspect, a method of evaluating a tentative location for a fixed subscriber communication site of a wireless communication system using a wireless testing system is provided. The wireless testing system comprises a testing antenna for communicating wireless communication signals with a transmit antenna and a receive antenna at a base station, an adjustable mount associated with the testing antenna for orienting the testing antenna in a plurality of pan orientations and a plurality of tilt orientations, an adjustable boom attached to the adjustable mount for positioning the testing antenna at a plurality of heights, a signal measuring device associated with the testing antenna and a signal attenuator associated with the testing antenna. The method comprises, at the tentative location: a) positioning the testing antenna such that an angle $\alpha$ defined by the testing antenna as a vertex between the transmit and receive antenna is 1.5 degrees or less; b) adjusting tilt, pan, and height of the testing antenna to exchange wireless communication signals with the transmit and receive antennae; c) measuring a characteristic of the wireless communication signals received by the testing antenna by integrating a power signal of the wireless communication signals across a frequency band associated with the wireless communication signals; d) attenuating the wireless communication signals until the testing antenna no longer receives the wireless communication signals from the transmit antenna; e) calculating ambient atmospheric and meteorological conditions corresponding to the amount of attenuation based on a distance between the testing antenna and the base station; and f) comparing the calculations of the ambient atmospheric and meteorological conditions to a predetermined threshold level required to maintain a level of service required for communications with the base station when the ambient atmospheric and meteorological conditions exist. Of the level of attenuation exceeds the threshold level, the tentative location for the fixed subscriber communication site is acceptable.

In yet another broad aspect, a method of establishing an optimal location for a fixed subscriber communication site for a base station having a transmit antenna and a receive antenna is provided. The method comprises, at a tentative location for the fixed subscriber communication site: a) positioning a testing antenna such that an angle $\alpha$ defined by the testing antenna as a vertex between the transmit and the receive antennae is 1.5 degrees or less; b) adjusting tilt, pan, and height of the testing antenna to exchange wireless communication signals with the transmit and the receive antennae; and c) measuring a characteristic of the wireless communication signals with the communication unit.

The testing antennae, receive antenna and transmit antenna may be located relative to each other to form a right angle triangle, and tan $\alpha$ may be less than or equal to a ratio comprising: a numerator comprising a distance from the receive antenna to the transmit antenna; and a denominator comprising a distance from the testing antenna to one of the receive antenna and the transmit antenna.

The characteristic may be power of the wireless communication signals integrated over a frequency band associated with the wireless communication signals.

The method may further comprise: attenuating the wireless communication signals until the testing antenna receives practically none of the wireless communication signals transmitted by the base station; calculating ambient atmospheric and meteorological conditions correspondng to the amount of attenuation based on a distance between the testing antenna and the base station; and comparing the ambient atmospheric and meteorological conditions to a predetermined threshold level required to maintain a level of service required for the testing antenna to communicate with the base station when the ambient atmospheric and meteorological conditions are present between the base station and the testing antenna.

The method may further comprise: repeating steps a), b) and c) at a second location; comparing characteristics measured at the tentative location and the second location; selecting one of the tentative location and the second location as the optimal location based on the step of comparing characteristics.

The method may further comprise variably attenuating the wireless communication signals before evaluating the characteristics of the wireless communication signals to simulate ambient atmospheric and meteorological conditions around the wireless testing system.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 1 is a block diagram of a wireless communication network comprising a base station transmitting to a plurality of subscriber stations located at different communication sites;

FIG. 1a is a block diagram of a communication site of FIG. 1;

FIG. 2 is a block diagram of a communication site of FIG. 1 utilizing a testing system embodied in the invention;

DETAILED DESCRIPTION OF EMBODIMENTS

Figure 3:
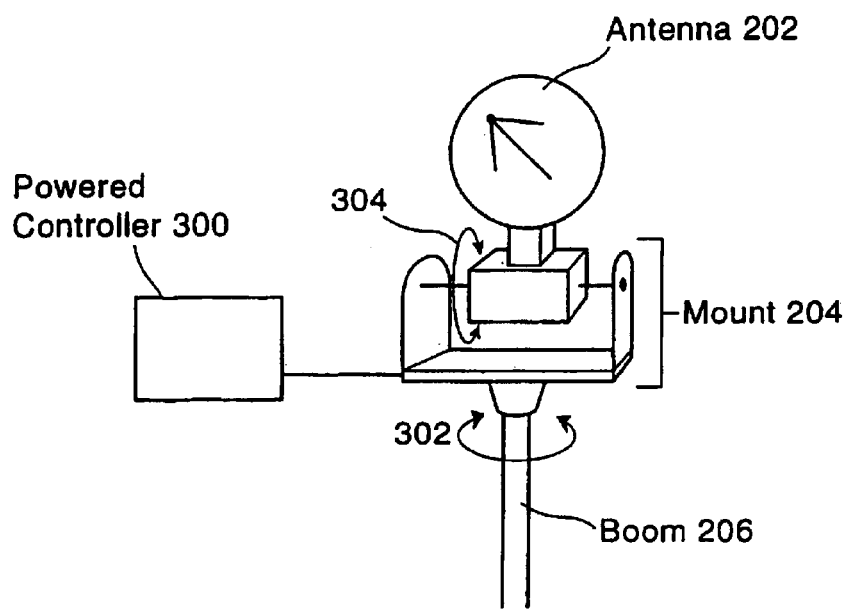
FIG. 3 is a diagram providing further detail of a mount and an antenna of the testing system of FIG. 2.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, wireless communication system 1 comprises base station 100 and a plurality of subscriber stations 102 at communication sites 104a, 104b and 104c. Each subscriber station 102 communicates with base station 100 via wireless communication signals. Base station 100 has a receive antenna 106 to receive wireless communication signals from subscriber stations 102 and a transmit antenna 108 to transmit wireless communication signals to subscriber stations 102. It can be appreciated that receive antenna 106 and transmit antenna 108 may be physically incorporated into a single antenna (not shown).

For signal transmission direction convention, wireless communication signals sent from base station 100 to subscriber station 102 are sent in a "downstream" direction and wireless communication signals sent from subscriber station 102 to base station 100 are sent in an "upstream" direction.

In wireless communication system 1, base station 100 or subscriber station 102 may be connected to their respective antennas via coaxial cable. Wireless communication signals used in system 1 are transmitted on frequencies in range of 24 GHz to 38 GHz. For a given wireless communication system, the frequency range used depends on legal and administrative regulations, including spectral licensing requirements established by any governmental bodies or agencies which regulate wireless communications in a country or region.

Since frequencies in the 24 GHz to 38 GHz frequency range are generally too high to be transmitted over coaxial cable, an intermediate frequency (IF) is used as a carrier. Depending on the radio frequency (RF) to be transmitted, the IF varies, but is generally in the range of 400 to 1000 MHz for the upstream and 1000 to 2000 MHz in the downstream. Within the selected IF, communication signals may be transmitted within a particular continuous band of frequencies. For downstream communications, the band is typically 36 MHz wide; for upstream communications, the band is typically 9 MHz wide. These ranges can be expanded if there is available space in the spectrum. The IF transmission is upconverted to the appropriate RF range by the transmit radio prior to broadcast. The incoming RF signal is downconverted by the receive radio prior to being sent along the coaxial cable. Accordingly, by measuring power of signals in the IF range received at communication sites 104, a measurement may be made of the strength of the wireless communication signals received thereat.

Referring to FIG. 1a, each subscriber station 102 comprises antenna 110 and communication station 112. When base station 100 (not shown in FIG. 1a) transmits wireless communication signals to a subscriber station 102, antenna 110 receives the wireless communication signals and transmits them through a connection to communication station 112. When communication station 112 generates a message to be transmitted from subscriber station 102 to base station 100, communication station 112 transmits the message through a connection to antenna 110 which in turn converts the message to a wireless communication signal which is transmitted to base station 100.

Referring to FIG. 2, the embodiment comprises wireless testing system 200 which may be located at communication site 104. Wireless testing system 200 provides a portable system and method of evaluating communication signals between base station 100 and communication site 104 without using subscriber station 102. Accordingly, it can be appreciated that transmission characteristics of wireless communication signals received at communication site 104 may be evaluated without deploying subscriber station 102 at communication site 104.

Wireless testing system 200 comprises antenna 202, mount 204, boom 206 and communication unit 208. Wireless communication signals are received and transmitted from antenna 202 to base station 100 (not shown). Signals received and transmitted by antenna 202 are provided to or generated by communication unit 208, through connection 210. Communication unit 208 includes components which provide measurement of transmission characteristics of the received signals, including power and frequency measurements.

Antenna 202 is attached to mount 204. Mount 204 is attached to boom 206. Boom 206 is adjustable to a plurality of heights and may have height demarcations thereon enabling an operator to determine the set height of boom 206. Boom 206 is extended to a height to provide antenna 202 with a line of sight to receive antenna 106 and transmit antenna 108 of base station 100. As wireless transmissions propagate and reflect in straight lines, having a line of sight between a transmitter antenna and a receiver antenna ensures that communications therebetween have the best potential for reception for those locations. In the embodiment, boom 206 has a system of one or more adjustable legs 212 allowing boom 206 to be adjusted to a level vertical position on uneven ground. In the embodiment boom 206 is a light stand, such as Model 126 U from Manfrotto of Germany.

Referring to FIG. 3, mount 204 allows positioning of antenna 202 in a plurality of pan and tilt orientations for antenna 202. Mount 204 may have pan and tilt gradation indicators thereon to enable an operator to record the current pan and tilt settings of mount 204. In the embodiment, mount 204 is a pan and tilt servo unit, such as Model PT680-24P available from Pelco of Clovis, Calif., U.S.A.

Mount 204 is positioned by a powered controller 300, adjusting the pan, as shown by arrow 302 and tilt, as shown by arrow 304, of antenna 202 remotely about boom 206. In the embodiment, powered controller 300 is a remote joystick controller, such as model MPT24DT, also available from Pelco. Powered controller 300 allows remote adjustment of the pan and tilt of antenna 202 when the aspects of the wireless signal are measured.

Figure 4A:
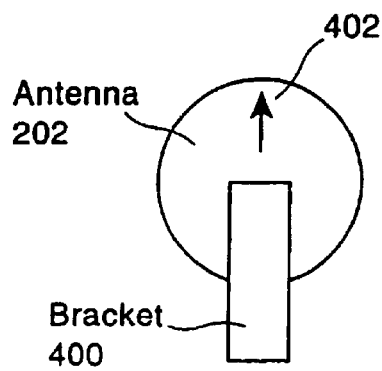
FIG. 4a is a block diagram of one orientation of the antenna on the mount of FIG. 3.
Figure 4B:
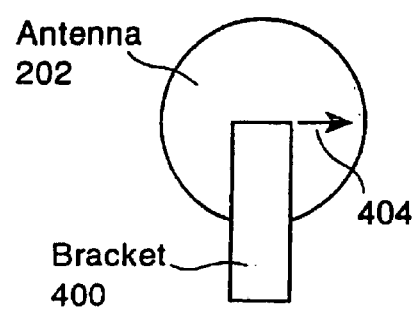
FIG. 4b is a block diagram of another orientation of the antenna on the mount of FIG. 3.

Referring to FIGS. 4a–4b, antenna 202 may be attached to mount 204 with bracket 400. Bracket 400 allows antenna 202 to be rotated about mount 204, thereby changing the relative polarity of transmissions sent from antenna 202 to base station antenna 106. It will be appreciated that the rotation of antenna 202 about mount 204 still maintains antenna 202 at a set plane relative to the base station 100, which is determined by the pan and tilt orientation of mount 204. In FIG. 4a, antenna 202 is oriented in a fully upright manner as indicated by arrow 402. In FIG. 4b, antenna 202 is oriented in a manner 90° from the orientation shown in FIG. 4a per arrow 404. Accordingly, transmissions from antenna 202 using the orientation of FIG. 4b are polarized with transmissions from antenna 202 having an orientation as shown in FIG. 4a.

Figure 5:
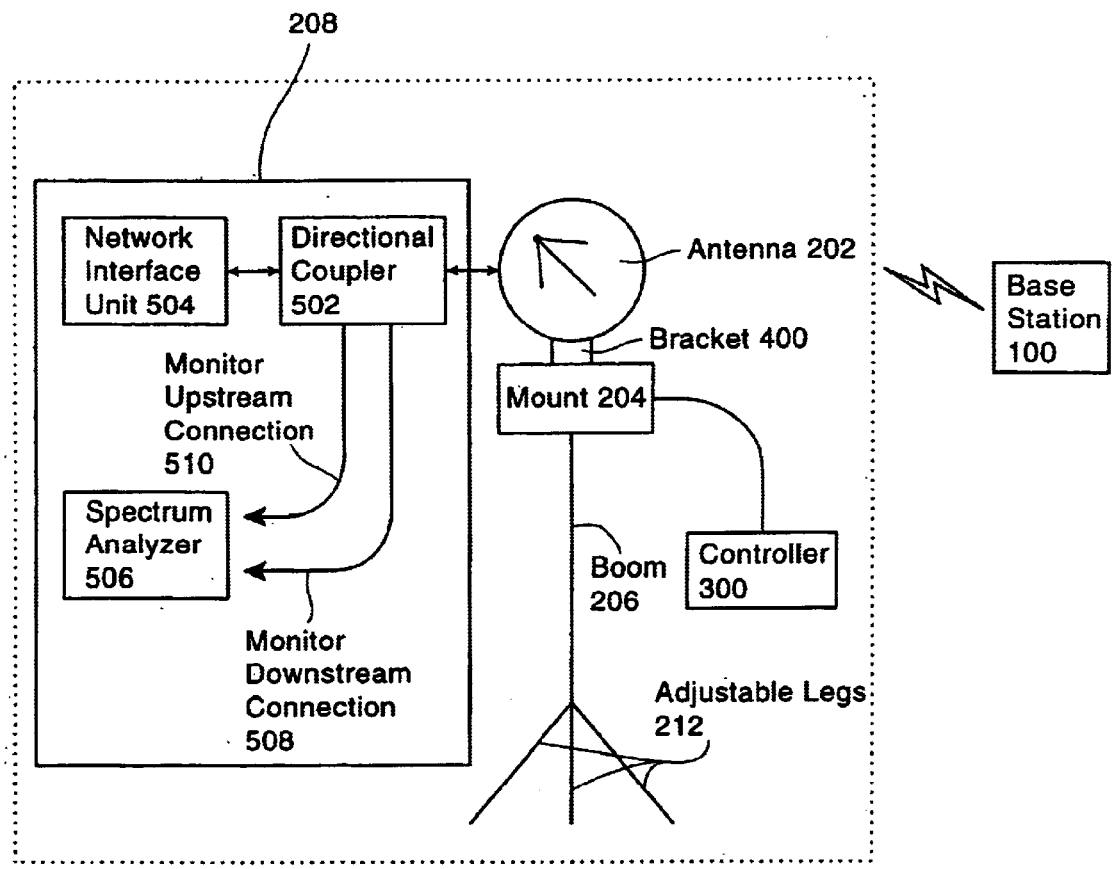
FIG. 5 is a block diagram providing further detail of the testing system of FIG. 2.

Referring to FIG. 5, signals received by antenna 202 are transmitted to communication unit 208. Communication unit 208 has directional coupler 502, Network Interface Unit 504 and spectrum analyzer 506. Directional coupler 502 splits the signals received to provide one signal tap to Network Interface Unit (NIU) 504 and another signal tap to spectrum analyzer 506. It can be appreciated that while directional coupler 502 may degrade signals received, the quantity of the degradation of the signals received is known. Accordingly, measurements of signals received may be adjusted to account for signal degradations produced by directional coupler 502.

Essentially, NIU 504 is a radio modem having multiple interfaces to process different communication protocols. In processing wireless communication signals, NIU 504 receives signals from base station 100 and demodulates the received signals into T1, ethernet or OC3 traffic streams. NIU 504 also generates messages for transmitting to base station 100 by receiving T1, ethernet or OC3 traffic and modulating the transmitted signals such that it may be transmitted wirelessly over a radio link several kilometres long. In the embodiment, NIU 504 may be modem model 28110 (providing T1 with ethernet communications), model 28130 (providing quad T1 with ethernet communications) or model 28180 (providing OC3 with ethernet communications), all available from Alcatel Canada Inc. of Kanata, Ontario, Canada. The generated messages are transmitted through connections to directional coupler 502 then to antenna 202. Antenna 202 converts the generated message to a wireless signal and transmits the wireless signal to base station 100. It can be appreciated that a bi-directional connection may be used between antenna 202 and directional coupler 502 and between NIU 504 and directional coupler 502 to transmit generated signals received from and transmitted to base station 100.

Characteristics of wireless communication signals received from base station 100 and generated by NIU 504 are measured by transmitting the signals received through directional coupler 502 to spectrum analyzer 506. It will be appreciated that various signal measurement devices may be used, as appropriate, in addition to spectrum analyzer 506. In the embodiment, spectrum analyzer 506 is a HP 8564E 40 GHz spectrum analyzer from Hewlett-Packard of Palo Alto, Calif., U.S.A.

In the embodiment, spectrum analyzer 506 can only be connected to monitor either the wireless communication signals received by NIU 504 or the wireless communication signals transmitted from NIU 504 at one time. Accordingly, spectrum analyzer 506 is shown unconnected. To measure aspects of wireless communication signals received by NIU 504, downstream connection 508 is connected with spectrum analyzer 506. To measure aspects of wireless communication signals transmitted by NIU 504, upstream connection 510 is connected with spectrum analyzer 506. It can be appreciated that a switching device may be used to switch between measuring wireless communication signals received by NIU 504 and wireless communication signals transmitted from NIU 504.

Figure 6:
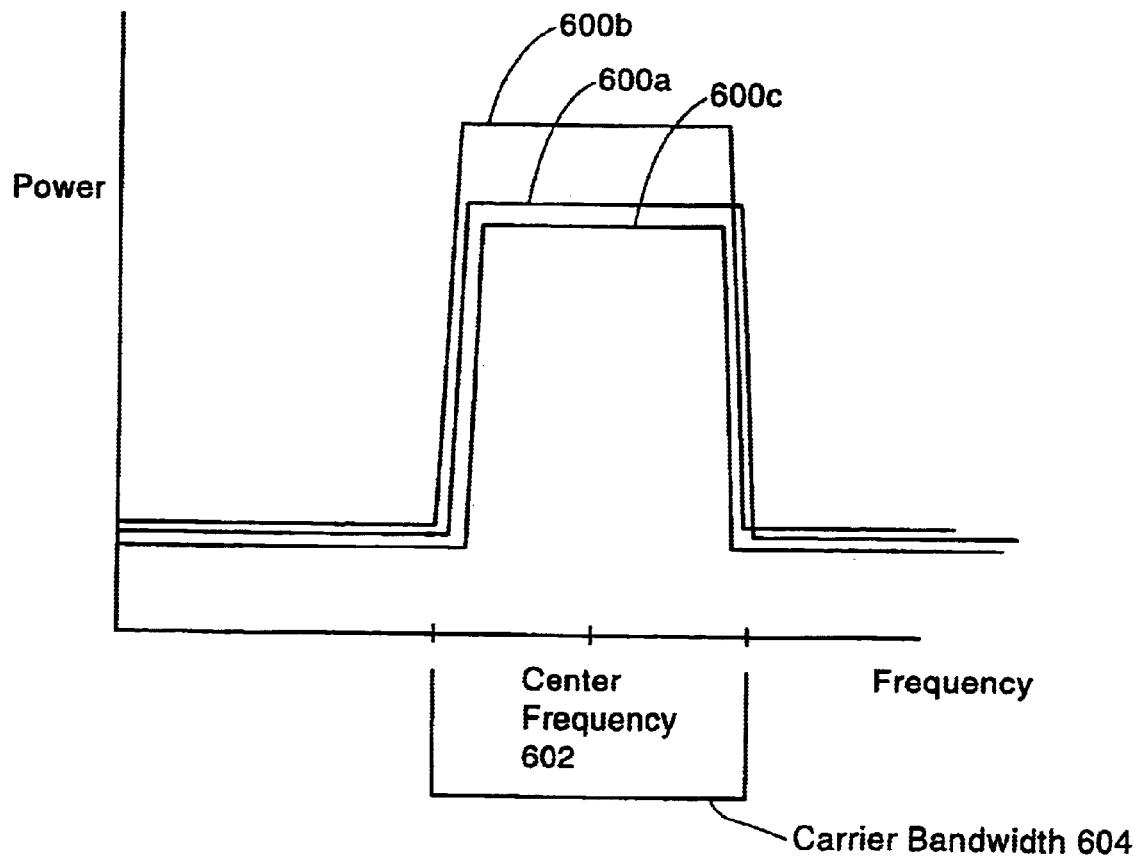
FIG. 6 is a power to frequency graph of representative wireless communication signal measurements for communication sites using the testing system of FIG. 2.

Referring to FIG. 6, when wireless testing system 200 is deployed at communication site 104 as described earlier, spectrum analyzer 506 can be used to measure characteristics of the wireless communication signals received and transmitted by NIU 504. To make a measurement, power signals are integrated over a frequency band to provide information relating to the total power received at the communication site.

As described earlier, downstream and upstream communication signals are transmitted in a selected range in an IF band. Frequency response curves 600a–600c provide representative power to frequency signals around center frequency 602 received from base station 100 by testing system 200 at various communication sites 104. As downstream signals are measured, center frequency 602 may be 1.0 GHz. As can been seen in curves 600a–600c, each curve has a "bump" representing the power in modulated signals received in the transmission carrier bandwidth 604. As downstream signals are measured, carrier bandwidth 604 is 36 MHz wide centered on 1.0 GHz. The larger the amplitude of the "bump", the more power has been received in the communication signal. Accordingly, curve 600b has power measurements that exceed power measurements over curves 600a and 600c. Accordingly, of the three measurements taken for the three different sites, the site associated with curve 600b, with the tested location, height, pan and tilt settings of testing system 200 should be selected as the final site for a subscriber station.

It can be appreciated that the optimum communication site would generally provide the best IF measurement. For each potential communication site, operator of testing system 200 may record the height of boom 206, the pan and tilt orientations of antenna 202 and the exact geographic location of antenna 202 using an appropriate global positioning system.

It can be appreciated that a similar set of measurements may be made when measuring upstream communication signals from various sites.

Referring to FIG. 5, testing system 200 may also evaluate upstream wireless communication signals. When wireless testing system 200 transmits wireless communication signals to base station 100, base station 100 may instruct NIU 504 via signals encoded in downstream wireless transmissions to communication station 112 to decrease the power of the wireless communication signals transmitted to conform to ideal power characteristics of wireless communication signals received by base station 100. This instruction is transmitted from base station 100 to NIU 504 through antenna 202.

Referring to FIG. 6, in an upstream communication signal measurement configuration, upstream communication signals may have an IF center frequency 602 of 500 MHz and a carrier bandwidth of 9 MHz. As upstream communication signals are measured, ideal transmission characteristics are that less power is used in transmissions. Therefore, for upstream communication signals at various communication sites 104, the signal having the lowest power over the carrier bandwidth is preferred. Accordingly, curve 600c represents the lowest power and the site associated with curve 600c is preferable for upstream communications.

Figure 7:
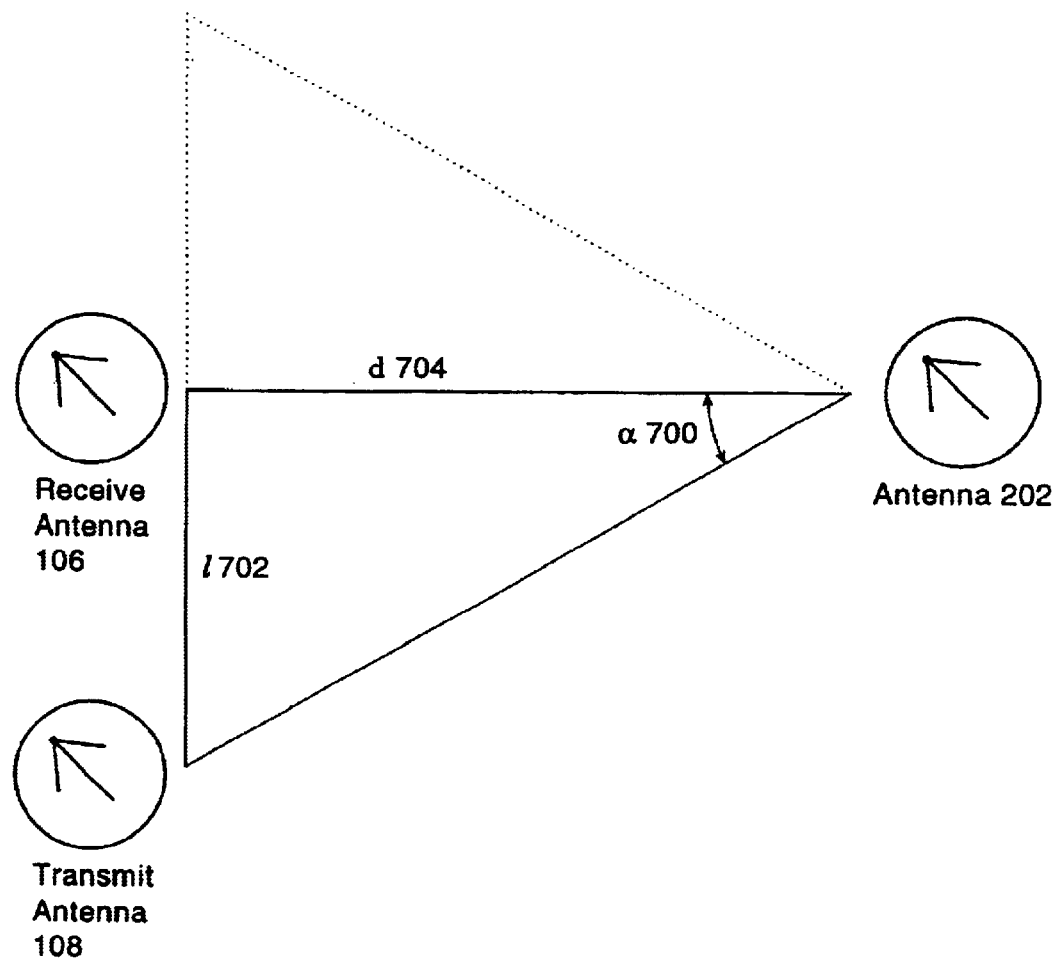
FIG. 7 is a schematic of an angular and distance relationships of a transmit antenna and a receive antenna at a base station with an antenna of the testing system of FIG. 2.

Referring to FIG. 7, antenna 202 used in the embodiment has a narrow beamwidth and a high-gain antenna. Wireless communication signals received by antenna 202 may lose 3 dB of signal strength when the received wireless signal is off-center from antenna 202 by 1.5° and 15 dB when off-center by 3°. When receive antenna 106 and transmit antenna 108 at base station 100 are positioned relatively close together, the horizontal beam width of antenna 202 in wireless testing system 200 may typically both receive wireless communication signals from and transmit wireless communication signals to base station 100.

The maximum relative lateral distance between receive antenna 106 and transmit antenna 108 that allows antenna 202 to communicate with both antennas 106 and 108 is determined by a angle 700. α angle 700 is the angle at antenna 202 made between receive antenna 106 and transmit antenna 108 and quantifies the azimuth between receive antenna 106 and transmit antenna 108 relative to antenna 202. Angle 700 is a function of 1 length 702 between the receive antenna 106 and the transmit antenna 108 and d distance 704 of antenna 202 from base station 100. The relationship can be expressed as:

$$\tan \alpha = Vd \qquad \text{(Equation 1)}$$

If α angle 700 in Equation 1 is not sufficiently small, antenna 202 may not be able to simultaneously receive and transmit wireless communication signals with base station 100.

Typically, if a angle 700 exceeds 1.5°, both receive and transmit antennas 106 and 108 of communication site 104 will not be within the half power points of the antenna pattern from base station 100. Accordingly, either the transmit or the receive path will be degraded. Since the fade margin is determined by the weakest link, the antenna must be adjusted to equalize both paths.

In a more general situation when subscriber antenna 110 is not perpendicular to the line between the receive and transmit antenna, a angle 700 may exceed the half power points of the antenna 110. The testing system 200 may be used to determine the optimal position of antenna 110 based on the receive and transmit signal strengths measured at the NIU 504.

It will be appreciated that antenna 202 may have similar directional issues for elevation differences between receive antenna 106 and transmit antenna 108 when both are located at base station 100, but not at the same height. Using Equation 1, d distance 704 is the distance of receive antenna 106 from antenna 202 and 1 length 702 is the height differential of the distance of antenna 202 to either receive antenna 106 or to transmit antenna 108. Use of Equation 1 to determine a maximum height differential follows the use of Equation 1 to determine a maximum allowable lateral differential, as described earlier.

It will be appreciated that in some circumstances, there may be both differential height and lateral distance issues with receive antenna 106 and transmit antenna 108.

The embodiment allows the antenna 202 to be set at several positions at several sites while testing for optimal fade margin in each position. The fade margin of wireless communication signals received by NIU 504 with the signals transmitted by NIU 504 may be equalized by adjusting the pan and tilt of antenna 202 through powered controller 300. The signal characteristics of the transmitted and received wireless signals are alternately monitored by spectrum analyzer 506 while adjusting the pan and tilt of antenna 202 until the fade margin of the wireless signals are equalized. Equalizing the fade margin of the wireless signals ensures continued communications with base station 100 if atmospheric and meteorological conditions which may interfere with wireless signals would cause only the weaker of the transmitted or received wireless signals to be lost. Since the weaker wireless signal is the limiting factor for communications with base station 100, equalized wireless signals ensure a higher level of reliability for communications with base station 100 when conditions would interfere with the wireless signals transmitted.

Figure 8:
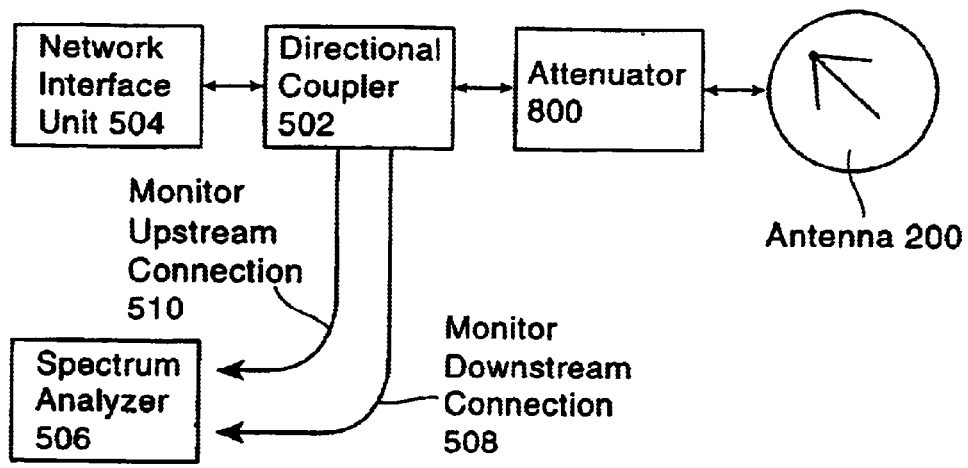
FIG. 8 is a block diagram of the testing system of FIG. 2 including a signal attenuator.

Referring to FIG. 8, another aspect of the embodiment has attenuator 800 to simulate ambient atmospheric and meteorological conditions on wireless communication signals in wireless testing system 200. For example, atmospheric and meteorological conditions such as ambient rain fog and snow, may absorb and reflect wireless communication signals transmitted from antenna 106 thereby decreasing the strength of the signal received at antenna 202. In operation, such atmospheric and meteorological ambient conditions may have the effect of attenuating wireless signals by 20 dB or more. Antenna 202 transmits wireless communication signals received from base station 100 through a connection to attenuator 800. Attenuator 800 may then be adjusted to attenuate the signals in the connection. These attenuated signals are then sent to directional coupler 502. Accordingly, attenuated signals may be evaluated by spectrum analyzer 506.

Figure 9:
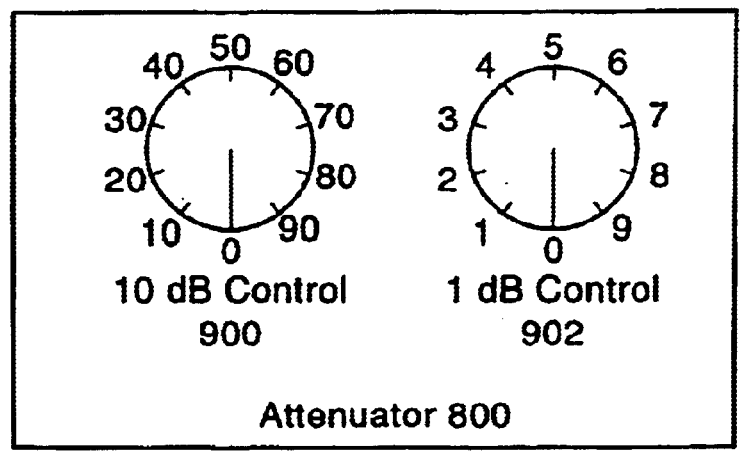
FIG. 9 is a block diagram providing further detail of the signal attenuator of FIG. 8.

Referring to FIG. 9, attenuator 800 can attenuate incrementally the wireless signal using control dials 900 and 902, which are connected to individual signal attenuator modules (not shown). 10 dB attenuation increments are provided by dial 900 and 1 dB attenuation increments are provided by dial 902. Attenuator 800 may comprise commercial signal attenuators known in the art such as HP 8494B and HP 8495B, both available from Hewlett-Packard of Palo Alto, Calif., U.S.A.

Attenuator 800 may be used to determine the amount of attenuation the wireless signal can withstand before the wireless testing system 200 can no longer communicate with the base station 100. The amount of attenuation that testing system 200 may be required to withstand depends on the rate of rainfall in the geographic location being tested and the proximity, azimuth and elevation of testing system 200 to base station 100.

At that point, the level of attenuation is compared against known threshold levels of atmospheric and meteorological conditions antenna placement at the communication site must withstand to maintain communications with base station 100 if a permanent wireless station were to be placed at communication site 104. For example, in the system by this embodiment, the level of attenuation the wireless testing system must withstand to maintain a reasonable level of service for a permanent wireless station, taking into account the attenuation of the elements in the wireless testing system 200, is 30 dB. If the level of attenuation recorded exceeds this threshold level, a permanent wireless station with the same pan, tilt and height of antenna 202 will maintain a reasonable level of service at communication site 104.

Ideally, subscriber antenna 110 should receive attenuated power from base station 100 to most accurately reflect effects of rain in attenuating downstream wireless signals. However, this would require decreasing the output power at base station 100, thereby affecting other customers on a live network. Accordingly, attenuator 800 may be used in lieu of reducing transmission power at base station 100.

Figure 10:
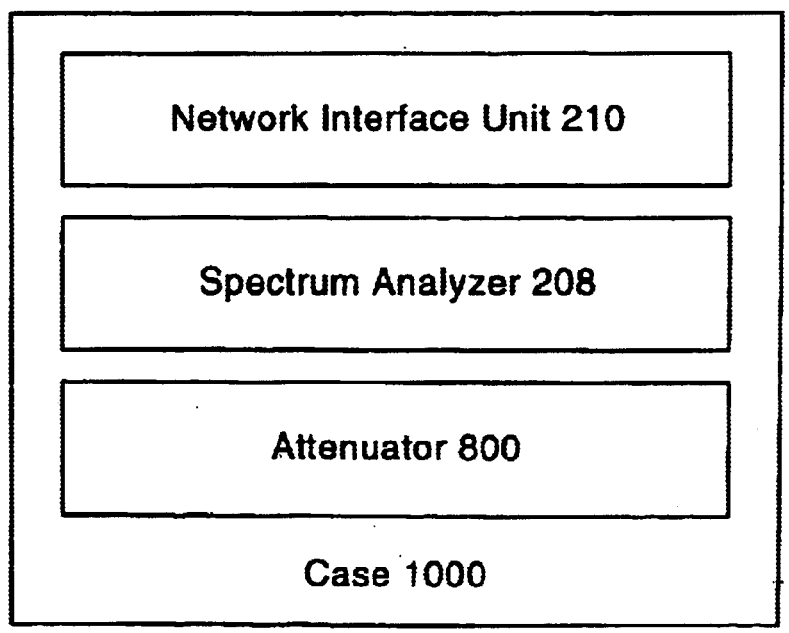
FIG. 10 is a block diagram of a casing containing the testing system of FIG. 2.

Referring to FIG. 10, wireless testing station 102, spectrum analyzer 506, network interface unit 210 and attenuator 800 may be housed in casing 1000 to provide portability for the wireless testing system 200. It can be appreciated that the mobile nature of the wireless testing system 200 is enhanced by having fewer individual pieces of equipment to move between communication sites 104a, 104b and 104c.

It is noted that those skilled in the art will appreciate that various modifications of detail may be made to the embodiments described herein, which would come within the spirit and scope of the invention as defined in the following claims.

I claim:

1. A method of evaluating a tentative location for a fixed subscriber communication site of a wireless communication system using a wireless testing system, said wireless testing system comprising a testing antenna for communicating wireless communication signals with a transmit antenna and a receive antenna at a base station, an adjustable mount associated with said testing antenna for orienting said testing antenna in a plurality of pan orientations and a plurality of tilt orientations, an adjustable boom attached to said adjustable mount for positioning said testing antenna at a plurality of heights, a signal measuring device associated with said testing antenna and a signal attenuator associated with said testing antenna, said method comprising:

at said tentative location
  a) positioning said testing antenna such that an angle α defined by said testing antenna as a vertex between said transmit and receive antennae is 1.5 degrees or less;
  b) adjusting tilt, pan, and height of said testing antenna to exchange wireless communication signals with said transmit and receive antennae;
  c) measuring a characteristic of said wireless communication signals received by said testing antenna by integrating a power signal of said wireless communication signals across a frequency band associated with said wireless communication signals;
  d) attenuating said wireless communication signals until said testing antenna no longer receives said wireless communication signals from said transmit antenna;
  e) calculating ambient atmospheric and meteorological conditions corresponding to said amount of attenuation based on a distance between said testing antenna and said base station; and
  f) comparing said calculations of said ambient atmospheric and meteorological conditions to a predetermined threshold level required to maintain a level of service required for communications with said base station when said ambient atmospheric and meteorological conditions exist,
wherein, if said level of attenuation exceeds said threshold level, said tentative location for said fixed subscriber communication site is acceptable.

2. A method of establishing an optimal location for a fixed subscriber communication site for a base station having a transmit antenna and a receive antenna, comprising:

at a tentative location for said fixed subscriber communication site
  a) positioning a testing antenna such that an angle α defined by said testing antenna as a vertex between said transmit and said receive antennae is 1.5 degrees or less;
  b) adjusting tilt, pan, and height of said testing antenna to exchange wireless communication signals with said transmit and said receive antennae; and
  c) measuring a characteristic of said wireless communication signals with said communication unit.

3. The method of establishing an optimal location for a fixed subscriber communication site, as claimed in claim 2 wherein
said testing antenna, receive antenna and transmit antenna are located relative to each other to form a right angle triangle;
tan α is less than or equal to a ratio comprising
  a numerator comprising a distance from said receive antenna to said transmit antenna; and
  a denominator comprising a distance from said testing antenna to one of said receive antenna and said transmit antenna.

4. The method as claimed in claim 3, wherein said characteristic is power of said wireless communication signals integrated over a frequency band associated with said wireless communication signals.

5. The method as claimed in claim 4, further comprising
attenuating said wireless communication signals until said testing antenna receives practically none of said wireless communication signals transmitted by said base station;
calculating ambient atmospheric and meteorological conditions corresponding to said amount of attenuation based on a distance between said testing antenna and said base station; and
comparing said ambient atmospheric and meteorological conditions to a predetermined threshold level required to maintain a level of service required for said testing antenna to communicate with said base station when said ambient atmospheric and meteorological conditions are present between said base station and said testing antenna.

6. The method as claimed in claim 2, further comprising:
repeating steps a), b) and c) at a second location;
comparing characteristics measured at said tentative location and said second location; and
selecting one of said tentative location and said second location as said optimal location based on said step of comparing characteristics.

7. The method as claimed in claim 2, further comprising variably attenuating said wireless communication signals before evaluating said characteristics of said wireless communication signals to simulate ambient atmospheric and meteorological conditions around said wireless testing system.

8. A method of establishing an optimal location for a fixed subscriber communication site for a base station having a transmit antenna and a receive antenna, comprising:

at a tentative location for said fixed subscriber communication site
  a) positioning a testing antenna such that an angle α defined by said testing antenna as a vertex between said transmit and said receive antennae is small enough to ensure that transmissions received at the base station from both said transmit antenna and said receive antenna are within half power points of an antenna pattern at said base station;
  b) adjusting tilt, pan, and height of said testing antenna to exchange wireless communication signals with said transmit and said receive antennae; and
  c) measuring a characteristic of said wireless communication signals with said communication unit.

9. A method of evaluating a tentative location for a fixed subscriber communication site of a wireless communication system using a wireless testing system, said wireless testing system comprising a testing antenna for communicating wireless communication signals with a transmit antenna and a receive antenna at a base station, an adjustable mount associated with said testing antenna for orienting said testing antenna in a plurality of pan orientations and a plurality of tilt orientations, an adjustable boom attached to said adjustable mount for positioning said testing antenna at a plurality of heights, a signal measuring device associated with said testing antenna and a signal attenuator associated with said testing antenna, said method comprising:

at said tentative location
- a) positioning said testing antenna such that an angle $\alpha$ defined by said testing antenna as a vertex between said transmit and receive antennae is small enough to ensure that transmissions received at the base station from both said transmit antenna and said receive antenna are within half power points of an antenna pattern at said base station;
- b) adjusting tilt, pan, and height of said testing antenna to exchange wireless communication signals with said transmit and receive antennae;
- c) measuring a characteristic of said wireless communication signals received by said testing antenna by integrating a power signal of said wireless communication signals across a frequency band associated with said wireless communication signals;
- d) attenuating said wireless communication signals until said testing antenna no longer receives said wireless communication signals from said transmit antenna;
- e) calculating ambient atmospheric and meteorological conditions corresponding to said amount of attenuation based on a distance between said testing antenna and said base station; and
- f) comparing said calculations of said ambient atmospheric and meteorological conditions to a predetermined threshold level required to maintain a level of service required for communications with said base station when said ambient atmospheric and meteorological conditions exist, wherein, if said level of attenuation exceeds said threshold level, said tentative location for said fixed subscriber communication site is acceptable.

* * * * *

UNITED STATES PATENT AND TRADEMARK OFFICE
CERTIFICATE OF CORRECTION

| | | |
|---|---|---|
| PATENT NO. | : 7,085,592 B1 | Page 1 of 1 |
| APPLICATION NO. | : 09/676402 | |
| DATED | : August 1, 2006 | |
| INVENTOR(S) | : Douglas Allan Davies | |

It is certified that error appears in the above-identified patent and that said Letters Patent is hereby corrected as shown below:

1. Specification, column 3, line 67: Replace the word "Of" with the word -- If --.

2. Specification, column 4, line 42: Insert the word -- and -- before the word "selecting".

Signed and Sealed this

Twentieth Day of March, 2007

JON W. DUDAS
*Director of the United States Patent and Trademark Office*